Patented Sept. 20, 1927.

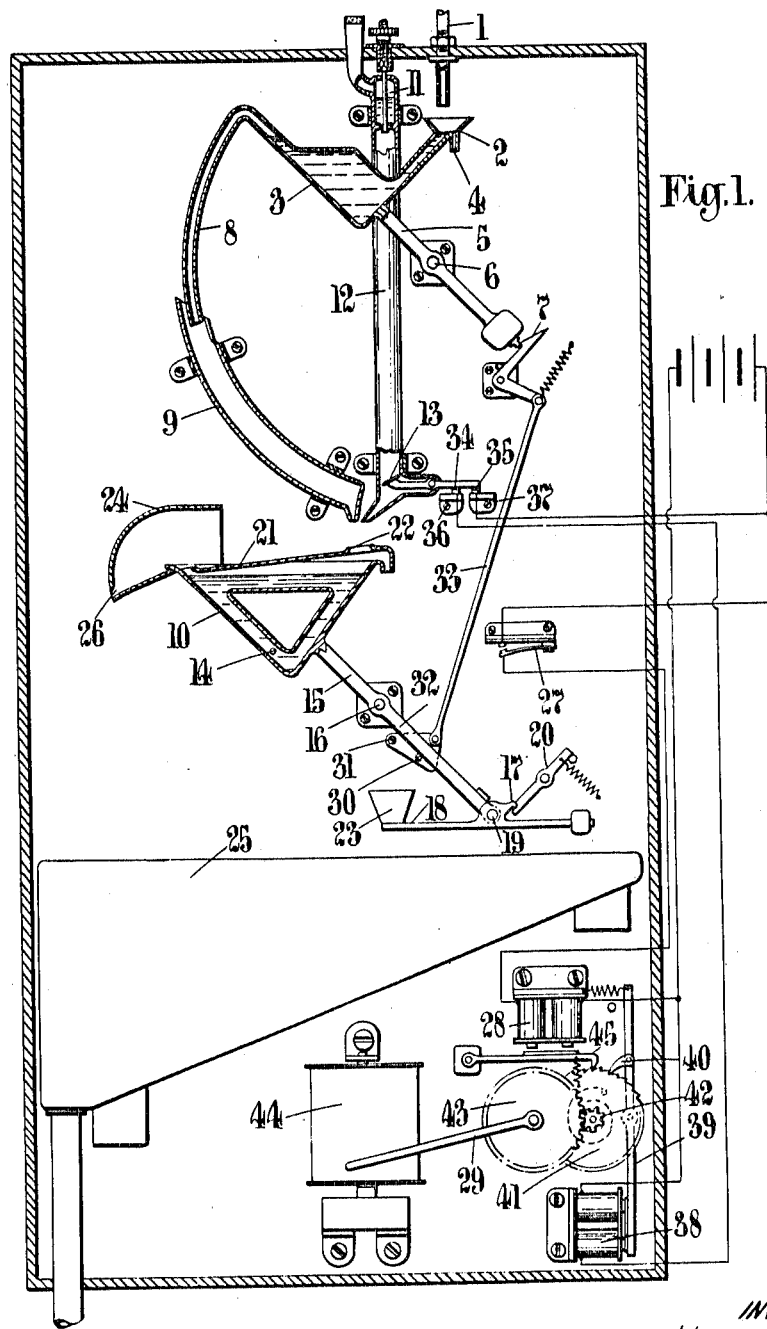

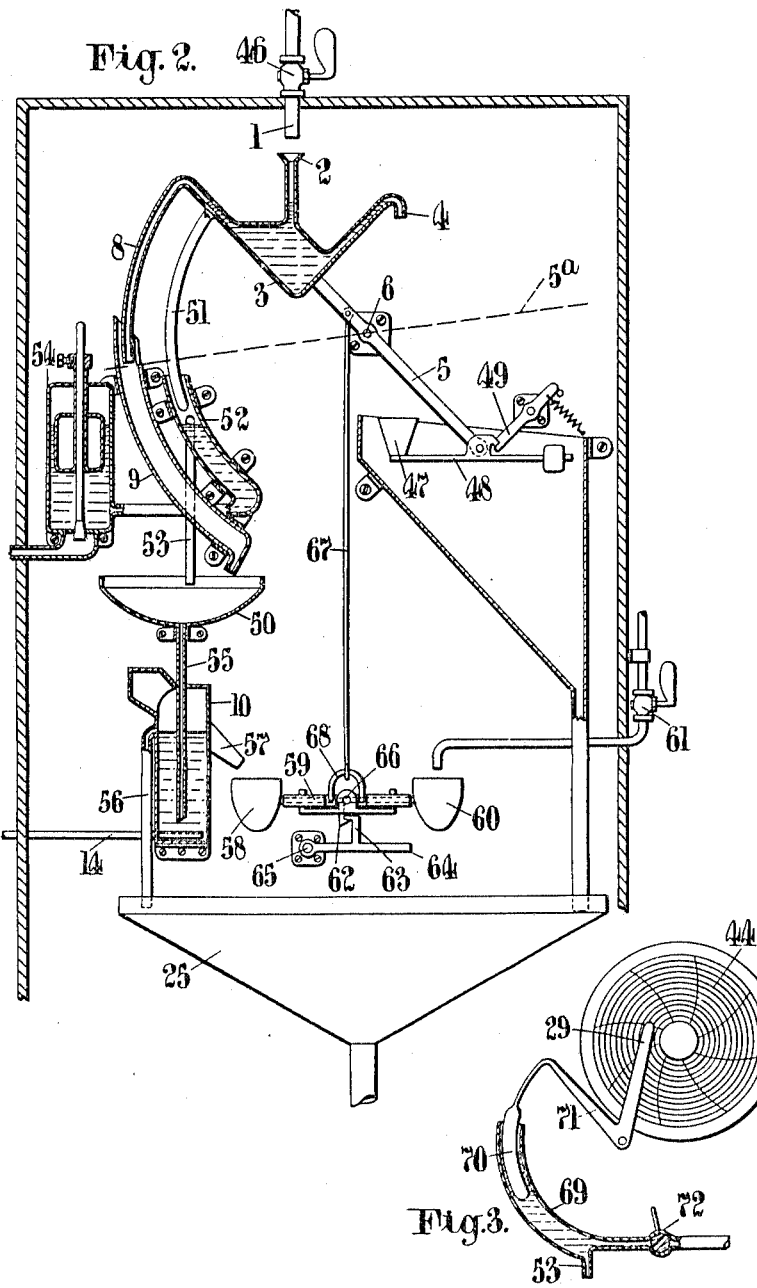

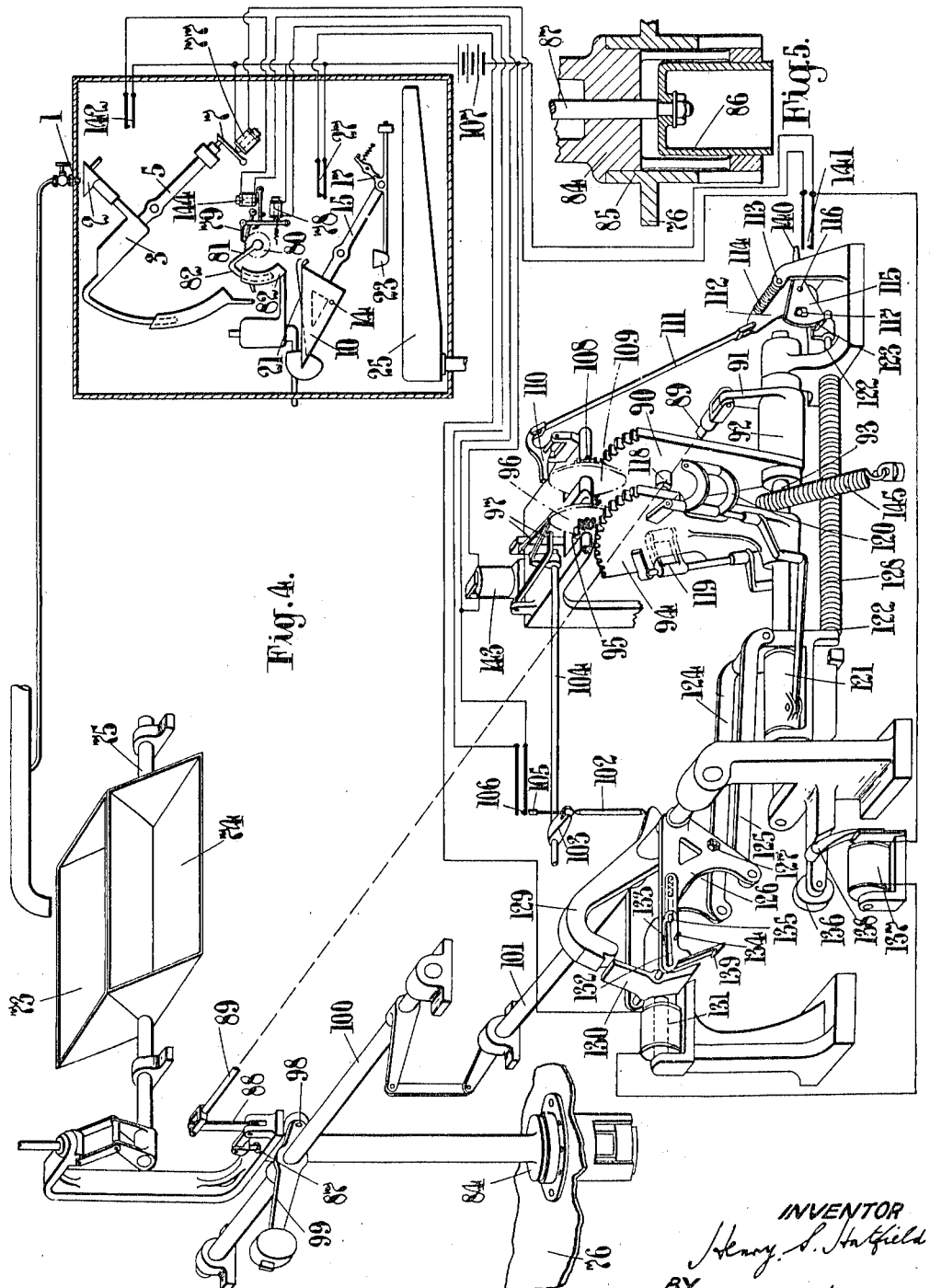

1,643,243

UNITED STATES PATENT OFFICE.

HENRY STAFFORD HATFIELD, OF LONDON, ENGLAND.

APPARATUS FOR EFFECTING CHEMICAL TESTS AND CONTROLLING CHEMICAL REACTIONS.

Application filed October 9, 1926, Serial No. 140,553, and in Great Britain October 14, 1925.

This invention relates to apparatus for automatically analyzing or testing liquids and for controlling plants in which chemical reactions take place in accordance with the results of analyses or tests carried out by the apparatus. Attempts have been made to construct apparatus for carrying out chemical tests by methods in which more or less of the steps are controlled automatically. Such apparatus usually however, are not quantitative but only indicate the presence or absence of a substance, but when attempts have been made to devise automatic testing apparatus to give quantitative results, these results have been obtained by measurement of the product of the reaction. It is the object of the present invention mainly to devise an automatic testing or analyzing apparatus which depends upon a balancing method or a null method.

According to the present invention, the testing apparatus is arranged so that the liquid to be tested and a reagent are mixed together in the apparatus, one of the two constituents being added to a known volume of the other, and the attainment of a balanced or null state, or the attainment of a condition definitely on one side or the other of the said null state, is employed to operate an indicator or recorder or to actuate the mechanism which controls the amount of a body allowed to take part in the reaction in a chemical plant or the period of time for which such a body is allowed to act. The change in physical conditions due to the null condition being reached or passed, is arranged to control a relay mechanism which operates the indicator or recorder or mechanism for controlling the plant. In order that the testing may be continuous, the said relay mechanism also preferably resets the apparatus for starting a fresh test. When the novel apparatus is used for a strictly quantitative measurement, the reagent or the liquid to be tested is added in successive small quantities to the other constituent, for example in drops or in small quantities displaced from a vessel by a displacement body thrust into the liquid in that vessel step by step. In an apparatus where the quantitative measurement is only required to indicate the presence of a substance, for example an impurity either to an extent less than or greater than a predetermined amount, measured quantities of the liquid to be tested and the reagent may be added simultaneously to a reaction vessel, and then the physical conditions showing whether the null condition has or has not been reached operate an indicator showing whether or not the predetermined amount of the impurity or other body is present or not.

The apparatus according to the invention is, of course, particularly applicable for measuring the hardness of samples of water and for controlling water-softening plant in accordance with the hardness of the water flowing into that plant or the water flowing out of that plant. In the case of a lime-soda water-softening plant a valve for supplying doses of lime-soda softening chemicals to measured quantities of the hard water may be set in accordance with the hardness of the water tested, for example the amount of standard soap solution which has to be added to a measured quantity of the water under test to reach the frothing point. In the case of a water-softening plant depending upon the property of base exchange of certain materials including artificial and natural zeolites, the valves admitting the hard water to such a plant and the valves for controlling the supply of regenerating salt may be actuated in accordance with the result of a previous test upon the effluent liquid from the plant. In the case of tests for estimating the hardness of water it is convenient to arrange for the apparatus automatically to pour a measured quantity of the water under test into a reaction vessel and then to add soap solution to it a small quantity at a time, for example drop by drop or step by step movement of a displacement body into a vessel containing standard soap solution. The latter method is very convenient inasmuch as the displacement body may be mounted to turn slowly about an axis, being advanced one step after a fixed period, for example by a ratchet drive. Air is blown into the reaction vessel so as to keep the soap solution and water agitated, and when the critical or null condition is attained to promote the formation of a copious amount of froth. At the end of each test the formation of froth trips the reaction vessel which empties itself in preparation for the next test, and at the same time controls the mechanism for recording the amount of soap solution added or for setting the valve or valves of the water-softening plant when such a plant is controlled by the apparatus.

The invention is particularly applicable to the control of water-softening plant in which the hard water is measured in a tipper comprising a pair of buckets which alternately fill and empty in accordance with the rocking motion imparted to the spindle on which the buckets are carried. Each measured quantity of hard water tipped from one or other of the buckets has added to it through a reciprocating valve a measured quantity of softening chemicals. In accordance with the invention a controlling member is advanced by a predetermined small amount each time a small measured quantity of standard soap solution is added to the measured quantity of water in the reaction vessel so that the amount of movement of this controlling member from its zero or starting position is a measure at any time of the amount of soap solution added, and the amount of such movement of the control member at the moment of formation of froth is a measure of the total soap solution added, and, therefore, a measure of the hardness of the sample of water in question. A second similar member connected to the chemical dosing valve is set after each test in a position corresponding to the final position of the first control member and adjusts the volume of chemicals fed at each actuation of the dosing valve, in accordance with the position of the first control member, and consequently an amount of chemical is fed at each actuation of the valve corresponding precisely to the hardness of the sample of water last tested.

In order that the invention may be clearly understood and readily carried into effect, various apparatus for carrying out the invention will now be described in greater detail with reference to the accompanying drawings, of which Figure 1 shows diagrammatically an apparatus for measuring and recording the comparative composition of a liquid;

Figure 2 shows an apparatus for determining whether a certain constituent of the liquid is present above or below a given quantity;

Figure 3 shows an apparatus for carrying out a modified method by which the amount of reagent delivered may be determined;

Figure 4 is a perspective view of a complete apparatus showing the invention applied to the control of a water softening apparatus, and Figure 5 is a central vertical section of the chemical feeding valve used in the apparatus shown in Figure 4.

Referring first to Figure 1, the liquid to be analyzed, for example water, the hardness of which must be determined, is admitted through the pipe 1 to the cup 2 of a measuring vessel 3. Any excess of water delivered by the pipe 1 runs to waste through the overflow 4 of the cup 2. This vessel 3 is carried on an arm 5 which is pivoted at 6 and held in the position shown by means of a catch 7. When the catch 7 is released by means of a mechanism which will be described shortly, the vessel 3 tilts over and delivers its contents through the tube 8 and the pipe or funnel 9 into the reaction vessel 10. The reagent, which may be soap solution, falls drop by drop from the small vessel 11 through the glass tube 12, and strikes a vane 13 from which it drops into the reaction vessel 10. The contents of this vessel 10 are kept in a state of continuous circulation in a clockwise direction by means of air blown through the opening 14, the peculiar shape of this vessel assisting in this circulation. The vessel 10 is carried on an arm 15 pivoted at 16, and is prevented from tilting by a projection 17 on a balanced lever 18 pivoted at 19 to the lower end of the arm 15. The positions of the pivot 19 and projection 17 are such that there is no tendency for the balance of the lever 18 to be upset until, as is explained hereinafter, liquid falls into a cup 23. The projection 17 is normally engaged by a spring controlled catch 20. When so much soap solution has been added that a copious frothing occurs in the reaction vessel, the froth rises upon the top of the liquid and encounters a sloping lid 21 by which it is deflected and forced towards the right hand side of the vessel 10 as seen in Figure 1. The lid 21 has an opening 22 through which the soap solution falls into the reaction vessel 10, but the presence immediately around this opening 22 of fresh soap solution prevents the froth from escaping through this opening. Owing to the copious frothing and to the continuous circulation of the contents of the vessel 10, drops of liquid are, however, forced out through a downwardly directed opening at the right hand side of the vessel 10 and fall into the cup 23 carried on the end of the balanced lever 18. The effect of this is to disturb the balance of the lever 18 which consequently rocks about 19, and so brings the projection 17 out of engagement with the catch 20. The weight of the vessel 10 and its liquid contents and of the part of the arm 15 above the pivot 16 is greater than the weight of the lever 18 and the part of the arm 15 below the pivot 16, so that the arm 15 now tilts about the pivot 16, and the contents of the vessel 10 are discharged through the hood 24 into the sink 25. A small hole 26 is provided in this hood 24 so that the liquid can only escape slowly, and, in consequence, the weight of the arm 15 only causes the vessel 10 to return to its original position when it has completely emptied itself. When the reaction vessel 10 tilts, it strikes a spring contact 27 which closes the circuit of an electromagnet 28 and so permits the pen 29 of a recording apparatus, which will be described shortly, to fall to its zero position. When the liquid has drained out of the reaction vessel 10, the weight of the arm 15 restores it to its initial position. On its return, it strikes a pin 30 fixed to a plate 31 pivoted at 32 and connected by a link 33 to the catch 7. When the arm 15 strikes the pin 30, the catch 7 is released and the measuring vessel 3 at once tilts over, delivering its charge through the tube 8 and 9 into the reaction vessel 10. Thus the next analysis or test can proceed almost immediately upon the conclusion of the first. The result of each analysis or test is automatically recorded by an electromagnetically operated counting apparatus. As each drop of reagent falls from the vessel 11, it strikes the vane 13 and tilts this so as to with-draw two contacts 34, 35 from mercury cups 36, 37, thus breaking the circuit of an electro-magnet 38. This operates an arm 39 carrying a pawl 40, and causes a toothed ratchet wheel 41 to rotate one step. This wheel 41 drives through a pinion 42 a wheel 43 carrying the pen 29. Thus each time a drop strikes the vane 13, the pen 29 records the fact upon a recording drum 44. The curve traced out upon this drum 44, is therefore, a record of the amount of reagent necessary for each sample of water tested. As previously described, the pen 29 is caused to return to its zero position at the end of each analysis obtained, by the energizing of electro-magnet 28 lifting a check pawl 45.

In Figure 2, an apparatus is shown in which fixed amounts of liquid and reagent are admitted to a reaction vessel 10 simultaneously, and this apparatus will indicate, for example, whether water is above or below a certain standard of hardness. The water to be tested is introduced in this case through the pipe 1 having a fine valve 46, and falls into the cup 2 of the measuring vessel 3. When the vessel 3 is full, the water flows through the overflow 4 into a cup 47 carried on a balanced lever 48 pivoted at the lower end of the arm 5 and held in position by a catch 49. The measuring vessel 3 is carried on an arm 5 pivoted at 6. Thus when the overflow from the measuring vessel 3 into the cup 47 releases the catch 49, the vessel 3 will tilt about the pivot 6 until the arm 5 takes the angular position shown by the dotted line 5ª. The measuring vessel 3 then discharges its contents through the tube 8 into a guide pipe or funnel 9 from which it flows into a further funnel 50 and into the reaction vessel 10. At the same time, a curved arm 51 consisting of a tube closed at the end and carried by the measuring vessel 3 is projected into a curved tube 52 and displaces a fixed volume of reagent through a pipe 53 into the funnel 50. To ensure that the volume of reagent displaced may be constant, the tube 52 is kept in communication with a reservoir 54 containing soap solution and constructed in a similar manner to the float chamber of a carburettor. This serves to keep the soap solution in the reservoir 54 and tube 52 at a constant level so that whenever the arm 51 is projected into the tube 52 a constant quantity of reagent is displaced into the funnel 50. The water and reagent mix in the funnel 50 and fall through the tube 55 into the lower part of the reaction chamber 10 displacing the contents of the latter which run to waste through the pipe 56 into the sink 25. Compressed air is admitted into the reaction chamber 10 by means of a perforated pipe 14. The air passing through the mixture in the reaction chamber 10 produces a mass of froth if the mixture contains an excess of soap, and this overflows, and sends a trickle of liquid down the pipe 57 into a cup 58. This cup 58 is carried at one end of a balanced arm 59, a second cup 60 being carried at the other end. Water is allowed to drip very slowly into the second cup 60 by means of a valve 61. Fixed to the arm 59 is a catch 62 which engages with a projection 63 on an arm 64 pivoted at 65. Unless there is enough liquid caused by the overflow of froth from the reaction chamber 10 flowing into the cup 58 to balance the water flowing into the cup 60, the arm 59 will tilt about the axis 66 and release the catch 62 so that the arm 64 falls. The arm 64 may be employed to actuate any visual indicator or electric bell contact so as to give a warning if the water under test is harder than a certain standard. In order that both cups 58 and 60 may be emptied at the end of each test the cups are mounted to be capable of turning over about an axis lying in the plane of the paper and a link 67 attached to the arm 5 and having its lower end engaging with a U-shaped member or stirrup 68 attached to the rod 59 normally prevents the cups from so turning over. The tilting, therefore, of the arm 5 causes rotation of the rod 59, and in consequence emptying of the cups 58 and 60.

Figure 3 shows a modification of the method by which the amount of reagent used may be recorded. In this case, a tube 69 constitutes the reservoir for the reagent which is delivered to the reaction vessel through the fine pipe 53. As the level of the reagent in the tube 69 falls, a float 70 also falls and this float 70 is attached by an arm 71 to a pen 29 which records continuously on a chart 44. It is necessary to fill the reservoir 69 to a constant level at the end of each analysis or test, and in consequence it is connected to a reservoir similar to the reservoir 54 shown in Figure 2 by means of a valve 72. The valve 72 is linked to the reaction vessel arranged as shown at 10 in Figure 1 so that it is opened when tilting occurs to refill the reservoir 59 and is closed, of course, when the reaction vessel tilts back to its operative position.

Figure 4 shows an apparatus for automatically controlling the supply of softening chemicals—which usually consist of a lime and soda mixture—to a water softening plant of the class in which a pair of tipping buckets 73, 74 rock upon a shaft 75 and each time that the measured quantity of water in one of these buckets is discharged there is added to it a measured quantity of the softening chemicals from a tank, the bottom 76 only of which is shown.

The automatic titrating or analyzing apparatus employed is shown in the right hand upper part of Figure 4. This apparatus is on the same lines as that shown in Figure 1, and as far as possible the same reference numerals have been applied. The main distinctions are the following:—The catch 7 which retains the arm 5 is in Figure 4 arranged to be released by an electro-magnet 77, and is not linked to the arm as in Figure 1. Secondly, the method of supplying standard soap solution in a small quantity at a time is altered. In Figure 4 there is an electro-magnet 78 which when energized reciprocates a pawl 79 which on each energization of the magnet 78 turns a ratchet wheel 80 one tooth. The ratchet wheel carries an arm 81 with a displacing member 82 which it gradually pushes into a vessel 83 containing standard soap solution. The latter is maintained at a constant level by an arrangement similar to a carburettor float chamber similar to that shown in Figure 2, so that on each motion of the displacement body a small and fixed amount of standard soap solution passes into the measured quantity of hard water in the reaction vessel 10. As in the arrangement shown in Figure 1 air is blown in through the pipe 14 into the reaction vessel 10 so that just at the point or just after the point at which the soap solution neutralizes the hardness in the water, the surface tension of the contents of the reaction vessel 10 is lowered, and copious frothing takes place. This is arranged to trip the reaction vessel 10 exactly as in Figure 1 by overweighting the cup 23. The vessel 10 in tilting closes the contacts 27 by means of the arm 15.

The valve for supplying at each actuation a measured quantity of softening chemicals is shown in greater detail in Figure 5. The main valve member 84 is raised and lowered at each actuation of the tipper shaft 75 through the mechanism shown in Figure 4. The member 84 makes joint with a flat seating on the bottom 76 of the chemical tank, and also makes a cylindrical joint where the lower part of the member 84 projects into a cylindrical casing carried by the bottom 76 of the tank. The arrangement is such that when the valve 84 is raised clear of the upper edge of the projection 85, the softening chemicals flow into the space within the valve formed by the valve 84 and the adjustable inverted cup 86. The dimensions of the parts are such that as the valve descends it closes the space to the chemicals within the tank 76 just before it allows the chemicals within the valve to flow out over the top surface of the cup 86 when they mix with the last volume of water discharged from the tipping buckets 73 or 74. The volume of the softening solution added to each actuation of the valve 84 is varied by raising or lowering the cup 86. This is effected in a manner which will be described later by a central rod 87, a bell crank 88, and a rod 89.

The rod 89 is actuated by a sector 90, the rod 89 being linked to an arm 91 fixed to a sleeve 92 which carries the sector 90 and turns with it about a common fixed shaft 93. Thus by the rocking motion of the sector 90, the amount of chemical supplied upon each stroke of the valve 84 is varied. The second sector 94 of the same size and configuration as the sector 90, is also mounted to rock about the shaft 93, but independently of the sector 90. The sector 94 gears with a pinion 95 fixed to a ratchet wheel 96 engaged by a pair of ratchets 97. The whole of the mechanism is driven from the tipper shaft 75, the up and down movement of the valve 84 being transmitted to a roller 98 carried by a weighted lever 99. Movements of this lever rock the shaft 100 which in its turn through arms and links rocks the shaft 101 which is connected by a link 102, and an arm 103 to the spindle 104 carrying the ratchets 97. Thus the ratchet wheel 96 is driven forward one tooth for each operation of the tipper shaft 75, and consequently for each operation of the shaft 75 the sector 94 is rocked forward a small but fixed amount. The link 102 is extended, ending in a projection 105 located below a pair of contacts 106. Thus the contacts 106 are closed at each operation of the tipper shaft 75, and these contacts are in the circuit of a battery 107 and the electro-magnet 78 which actuates the ratchet wheel 81. The result is that each operation of the tipper shaft 75 also advances the displacement body 83 one step and causes one small fixed quantity of soap solution to be added to the hard water in the reaction vessel 10. Thus if the sector 94 and the displacement body 83 each start from a zero position, their positions at any moment correspond with one another and with a volume of standard soap solution added from the commencement of a given test. As already mentioned, when the froth forms liquid falls into the cup 23 and trips the arm 15 so that the reaction vessel 10 empties into the sink 25, closes the contacts 27, and then returns to its normal position to receive a fresh fixed amount of hard water.

The connections between the sector 90 and the adjustable cup or piston 86 in the chemical valve 84 are such that the amount of chemical added by this valve is correct when the sector 90 takes up the same position as, or is in registration with, the sector 94 whose position depends upon the amount of soap solution added during the test. If, therefore, the member 86 has been correctly set, and the hardness of the water has remained constant since the last test or titration, at the moment of production of froth, the sector 94 will have moved to such a position that it will just come into registration with the sector 90. If, however, since the last setting of the sector 90 the hardness has changed, the sector 94 will not move into registration with the sector 90. It will just fail to reach that position if the hardness has become less, but will just overstep that position if the hardness has increased. To deal with this, means are provided for automatically bringing the sector 90 after each test so that it registers with the newly taken up position of the sector 94. The sector 90 engages with a pinion 108 which is fixed to a toothed wheel 109 engaged by a catch or detent 110. The detent 110 is connected by a rod 111 to a plate 112 pivoted about an axis 113 but held in the position shown in Figure 4 by a coiled spring 114. A similar plate 115 is pivoted on the plate 112 at the point 116, but by means of a pin and slot connection 117 the plate 115 has a sliding lost motion upwards relative to the plate 112.

The sector 90 carries a projection with a roller 118, and the sector 94 carries a pair of pivoted nippers or jaws 119, 120 which are linked to a sliding piece 121. When the sliding piece 121 is moved to the right in Figure 4, the nippers 119, 120 close on the roller 118, and if the sector 90 is not truly in registration with the sector 94 these nippers bring it into registration. A rod 122 is attached to the sliding piece 121 and carries at its extreme right hand end a pin 123 which presses on the swinging plate 115 when the rod 122 moves to the right. It swings the plate 115 until the pin 123 escapes under the point of the plate 115, and then on the return motion of the rod 122 the pin 123 slides along the under inclined surface of the plate 115 slightly lifting it as allowed by the lost motion, so that in the movement of the rod 122 to the right the plate 112 is pulled backwards raising the detent 110, but on the backward movement the plate 112 is left free. Thus if the sector 90 be not correctly placed relatively to the sector 94 one or other of the nippers 119, 120 will meet the roller 118 and bring the sector 90 into the correct position as the latter has been released by lifting the detent 110. As mentioned, at the extreme end of the travel of the sliding piece 121 the detent 110 is allowed to fall, and on the return stroke of the sliding piece the detent is not lifted.

In this connection movement of the sliding piece 121 producing the registration of the sector 90, is carried out in the following way:—The sliding piece 121 is connected by links 124 and 125 to a pivoted frame 126 consisting of two bell crank plates rigidly connected together by a cross rod 127. These and the sliding piece 121 are normally held in the position shown in Figure 4 by the coiled compression spring 128. The frame 126 is freely pivoted upon the shaft 101. However, an arm 129 is rigidly pinned to the shaft 101 so that at each motion of the tipper the forward end of the arm 129 moves downwards between the two members of the frame 126 through an angle of about 60 degrees. A clutch plate 130 is pivoted in the upper end of the frame 126, and its normal position is such that its upper edge just lies outside the extremity of the arm 129. However, when its lower end, which forms the armature of an electro-magnet 131, is attracted to the left, its upper edge is carried into the path of movement of the arm 129 and then upon the next motion of the tipper, the arm 129 through the plate 130 depresses the whole frame 126 thereby thrusting the sliding piece 121 to the right, and bringing the sectors 90 into registration with the sector 94. The arrangement must be such that this occurs when a hardness test is completed and froth is formed in the reaction vessel 10. This is ensured by connecting the contacts 27 in circuit to the battery 107 and the electromagnet 131 so that the latter is energized once when the reaction vessel tips at the end of the test. It is necessary to arrange for the plate 130 always to lie definitely in its outer or inner position as any uncertainty in either of these positions cannot be allowed. Therefore, the pivot of the plate 130 has fixed to it an arm 132 working between upper and lower stops 133 and 134, the end of the arm 132 being engaged by a spring pressed knob 135. By this arrangement, when the reaction vessel 10 is tilted, the plate 130 is put into such a position that the next time the tipper shaft 75 operates the sectors 90 and 94 are brought into registration, and if there has been any change in the hardness of the water the valve member 86 is re-set. It is necessary, however, to make provision for the case when the contacts may be maintained closed until the arm 129 returns. In this case, if the frame 126 were allowed to return with it the plate 130 which is thrown over at the extreme end of the downward travel of the frame 126 by means of a fixed roller 136, would again be set in position to meet the arm 129 when the latter was pushed down at the next operation of the tipping shaft 75, and the nippers 119 and 120 would be actuated again at the next motion of the tipper shaft 75. This cannot be allowed, of course, because it is necessary to re-set the sector 94 to zero as soon as the valve 84 has been re-set. The provisions for restoring the sector 94 to its zero or starting position will be described below. In order, therefore, to prevent the return of the frame 126 before the current through the electro-magnet 131 has ceased, the second electro-magnet 137 is connected in series with the electro-magnet 131 and its armature carries a catch 138 which engages with a hook 139 as long as current passes through the magnets 137 and 131. Therefore, while this current persists the frame 126 is held down although the arm 129 may return. When, however, the current fails the catch 138 releases the hook 139, and the roller 136 has rocked the plate 130 into position not to be engaged by the arm 129, and then the frame 126 is returned to its upper position by the coiled spring 128.

When the sliding member 121 is returned to the left hand normal position as already explained, the pin 123 rides on the under surface of the pivoted plate 115 and the latter has a tail projection 140 which then closes contacts 141. These contacts are in the circuit of the battery 107 and the electro-magnet 77 which when energized attracts the catch 7 and allows the measuring vessel 3 to discharge a fresh measured charge of hard water into the reaction vessel 10. The movement of the arm 5 carrying the measuring vessel 3 closes further contacts 142 which are in circuit with the battery 7 and an electro-magnet 143 and an electro-magnet 144. The former electro-magnet raises both pawls 97 from the ratchet wheel 96 and allows the sector 94 to be drawn back to its zero position by a tension spring 145, and the electro-magnet 144 raises the pawls from the ratchet wheel 80, and so allows the displacement body to go to its zero position.

Although some forms of apparatus in accordance with the present invention have been described in detail, the invention is in no way limited to these. The delivery of given volumes of liquid or reagent may be accomplished in a variety of ways; in particular it may be advantageous to supply the reagent by means of a mechanically driven pump, the recording pen or other mechanism being driven pari passu by the same motor. The persence of excess of soap solution may be indicated by causing the rising foam to move a vane, or to connect electrically two electrodes placed close to the liquid surface, the catch 6 being then released by an electro-magnet.

Again the pressure necessary to force a gas through a fine orifice against the surface tension may be used to measure the progress of the reaction. The lower the surface tension is the lower is this pressure. Hence if the tube 14 be supplied with air or gas from a source at constant pressure through a tube having a resistance to the flow of air of the same order as that presented by the tube 14, the pressure of the air at the point where it enters 14 will vary greatly with the resistance offered by 14, which resistance will fall as the surface tension of the liquid diminishes. This change in pressure may be made to operate the catch 17 directly, by means for instance, of a manometric membrane, or if it is very small, it may actuate a suitable relay through a sensitive manometer. The foregoing method may be applied in cases where the froth method is not available, since the production of froth requires other conditions besides the lowering of surface tension.

The arrangement of apparatus just described, with the catch 17 replaced by one released by an electromagnet, is suitable in cases where various electrical methods are used to indicate an end-point.

Other methods which may be applied for the determination of the end-point in suitable instances consist of the use of a hydrogen electrode or of a relay operated by a hydrogen electrode, of the change in resistance of a solution or of the decomposition voltage. For example, the hydrogen electrode is particularly suitable for the titration of acids and alkalis. The electric resistance may often be employed in cases where precipitation occurs, while the decomposition voltage is particularly suitable in cases where a metal such as copper or silver, which deposits at a low voltage, is removed from solution by precipitation, or a depolarizer, such as chlorine, bromine, or iodine, is destroyed by a reagent such as solution of a ferrous salt.

The use of an air jet at 14 may be retained in these cases as a suitable means of stirring, the electrodes of the electric indicator being either fixed in the vessel 10 or fixed to the base-board and arranged to dip into the vessel 10 when the latter is in its working position. The cover 21 may be omitted.

In volumetric analysis coloured indicators, such as phenol phthalein, methyl orange, litmus, permanganate, are very commonly used. If the vessel 10 be made of glass or other transparent material, a beam of light may be sent through 10, and received upon a photoelectric cell or other light sensitive receiver. The beam of light will be preferably filtered either before or after passing the vessel 10 the nature of the filter being such as to pass those rays absorbed by the coloured indicator. Gelatine filters coloured by various dyes may now be obtained, which allows certain regions only of the spectrum to pass. Thus the rays which a Wratten B filter allows to pass are absorbed by phenol phthalein red. The indication of the light sensitive receiver is caused to work a relay, which supplies current to the electromagnet operating the catch 17. The end point of the reaction may by the colour change of the indicator, cause either transmission or stoppage of light, as the case may be, but of course the relay can be arranged to operate the catch in either case.

It is evident that in apparatus according to the present invention, the role of liquid and reagent may be interchanged, a measured volume of the reagent being taken, and the liquid being added to it until the reaction is complete, the indication being given by the amount of liquid added. It is also evident that a measured volume of one reagent may be added to the measured volume of liquid, a second reagent being then added through a measuring device until reaction is complete. Thus, an alkaline liquid may be analyzed by means of soap solution, by adding to the measured volume of liquid a sufficient amount of acid to over-neutralize, and then determining the amount of acid in excess by means of soap solution. The addition of the measured volume of reagent may be effected for instance, by the addition of a second tilting vessel released at the same moment as the measuring vessel, and also discharging into the reaction vessel.

Furthermore, the invention is not limited to the form of control mechanism described, but it contemplates any mechanism which sets the feed valve or other feed arrangement of a water softening plant in a position depending upon the hardness of the water to be revealed by a preceding automatic test. For example, the invention may quite well be applied to control a water softening plant employing a base-exchange material wherein at the end of the softening process by closing certain valves and opening others, a common salt solution is admitted to the bed of softening material to regenerate the latter, and after regeneration the valves are operated to restore the apparatus to the softening condition. In accordance with the invention, samples of the effluent soft water are automatically tested and when the hardness exceeds a figure settled previously the control mechanism sets the valves for regeneration. Again the effluent is tested and when the test shows an absence of hardness (in this particular instance where soap solution is used for titration, an excess of common salt will be returned as hardness) the control mechanism again sets the valves for admitting the soft water to the soft water outlet.

Moreover, when a control mechanism constructed in accordance with the invention is employed, for example, that shown in Figure 4, it may be useful to have an indication of the results of the tests carried out. For instance, an audible or visual signal as referred to in connection with Figure 2, or a recording apparatus as shown in Figure 1 may be embodied in the control apparatus shown in Figure 4. In the latter event, the pen 29 may be employed geared to the ratchet wheel 80 in Figure 4.

Finally, the invention is obviously not limited to the control of water-softening plant. It is clear that it can be applied to controlling plant in which chemical reactions generally are carried out and can, in fact, be applied to control any of the reactions referred to above.

Having thus described my invention, what I claim as new and desire to secure by Letters Patent is:—

1. An apparatus for analyzing a liquid comprising in combination means for measuring a known volume of one liquid, means for adding to said known volume a second liquid capable of reacting chemically with said first liquid to produce a physical change in the mixture at a critical stage of the reaction, a relay mechanism, means controlled by said physical change for actuating said relay mechanism and an indicating device in operative connection with said relay mechanism.

2. An apparatus for analyzing a liquid comprising in combination means for measuring a known volume of one liquid, means for adding to said known volume a second liquid, capable of reacting chemically with said first liquid to produce a physical change in the mixture at a critical stage of the reaction, a relay mechanism, means controlled by said physical change for actuating said relay mechanism, means actuated by said relay mechanism for resetting said apparatus preparatory to a fresh analysis and an indicating device in operative connection with said relay mechanism.

3. An apparatus for analyzing a liquid comprising in combination means for measuring a known volume of one liquid, means for adding to said known volume a definite small quantity at a time of a second liquid, capable of reacting chemically with said first liquid to produce a physical change in the mixture at a critical stage of the reaction, a relay mechanism, means controlled by said physical change for actuating said relay mechanism and an indicating device in operative connection with said relay mechanism.

4. An apparatus for analyzing a liquid comprising in combination a reaction vessel, means for measuring a known volume of liquid into said reaction vessel, means for adding to said reaction vessel a second liquid, capable of reacting chemically with said first liquid to produce a physical change in the mixture at a critical stage in the reaction, means for agitating the mixture in said reaction vessel, a relay mechanism, means controlled by said physical change for actuating said relay mechanism and an indicating device in operative connection with said relay mechanism.

5. An apparatus for analyzing a liquid comprising in combination means for measuring a known volume of one liquid, means for adding to said known volume a definite small quantity at a time of a second liquid capable of reacting chemically with said first liquid to produce a physical change in the mixture at a critical stage of the reaction, a recording apparatus, means actuated upon each addition of said second liquid for operating said recording apparaus, a relay mechanism, means controlled by said physical change for actuating said relay mechanism, said relay mechanism being operatively connected to said recording apparatus.

6. An apparatus for analyzing a liquid comprising in combination means for measuring a known volume of one liquid, a container for a second liquid capable of reacting chemically with said first liquid to produce a physical change in the mixture at a critical stage of the reaction, a displacement body in said container, means for imparting a step-by-step motion to said displacement body to displace a definite small quantity at a time of said second liquid from said container into said known volume, a recording apparatus operatively connected to said displacement body, a relay mechanism and means controlled by said physical change for actuating said relay mechanism, said relay mechanism being also operatively connected to said recording apparatus.

7. An apparatus for analyzing a liquid comprising in combination a measuring vessel, means for filling said measuring vessel with the liquid to be analyzed, a reaction vessel to contain said measured volume of the liquid to be analyzed, means for adding to said reaction vessel a second liquid, capable of reacting chemically with said first liquid to produce a physical change in the mixture at a critical stage of the reaction, a relay mechanism, means controlled by said physical change for actuating said relay mechanism, and means in operative connection with said relay mechanism for tilting said measuring vessel to deliver a fresh charge into said reaction vessel.

8. An apparatus for analyzing a liquid comprising in combination a reaction vessel, means for measuring a known volume of liquid into said reaction vessel, means for adding to said reaction vessel a second liquid capable of reacting chemically with said first liquid to produce a physical change in the mixture at a critical stage in the reaction, a relay mechanism, means controlled by said physical change for actuating said relay mechanism and means in operative connection with said relay mechanism for tilting said reaction vessel to discharge its contents at the end of each analysis.

9. An apparatus for analyzing a liquid comprising in combination a reaction vessel adapted to be filled with measured quantities of a liquid from a measuring vessel, means for filling said measuring vessel with the liquid to be analyzed, means for adding to said reaction vessel a second liquid capable of reacting chemically with said first liquid to produce a physical change in the mixture at a critical stage of the reaction, a relay mechanism, means controlled by said physical change for actuating said relay mechanism, means in operative connection with said relay mechanism for tilting said reaction vessel to discharge its contents at the end of each analysis and means also in operative connection with said relay mechanism for tilting said measuring vessel to deliver a fresh charge into said reaction vessel.

10. An apparatus for analyzing a liquid comprising in combination means for measuring a known volume of one liquid into a reaction vessel, means for adding to said reaction vessel a second liquid capable of reacting chemically with said first liquid to produce an increase in volume of the contents of said reaction vessel at a critical stage of the reaction, a relay mechanism actuated by an overflow of liquid from said reaction vessel consequent upon said increase in volume and an indicating device in operative connection with said relay mechanism.

11. An apparatus for estimating the hardness of water comprising in combination a reaction vessel, means for pouring a measured quantity of water into said reaction vessel, means for adding standard soap solution to the water in said reaction vessel, means for agitating the mixture in said reaction vessel, a relay mechanism, means set into operation by the froth formed in said reaction vessel for actuating said relay mechanism and an indicating device in operative connection with said relay mechanism.

12. An apparatus for estimating the hardness of water comprising in combination a reaction vessel, means for pouring a measured quantity of water into said reaction vessel, means for adding standard soap solution in definite small quantities at a time to said reaction vessel, a recording apparatus, means actuated upon each addition of soap solution for operating said recording apparatus, means for agitating the mixture in said reaction vessel, a relay mechanism, means set into operation by the froth in said reaction vessel for actuating said relay mechanism said relay mechanism being operatively connected to said recording apparatus.

13. An apparatus for estimating the hardness of water comprising in combination a reaction vessel, means for pouring a measured quantity of water into said reaction vessel, means for adding standard soap solution to said reaction vessel, means for agitating the mixture in said reaction vessel, a relay mechanism, means set into operation by the froth formed in said reaction vessel for actuating said relay mechanism, means in operative connection with said relay mechanism for resetting the apparatus at the end of each analysis for the start of a fresh analysis and an indicating device in operative connection with said relay mechanism.

14. An apparatus for estimating the hardness of water comprising in combination a reaction vessel, means for pouring a measured quantity of water into said reaction vessel, means for adding standard soap solution to said reaction vessel, means for blowing air through the mixture in said reaction vessel, a relay mechanism, means set into operation by the overflow of froth formed in said reaction vessel for actuating said relay mechanism and an indicating device in operative connection with said relay mechanism.

15. An apparatus for estimating the hardness of water comprising in combination a reaction vessel, adapted to be filled with measured quantities of water from a measuring vessel, means for filling said measuring vessel with water, means for adding to said reaction vessel a definite small quantity at a time of standard soap solution, means for agitating the mixture in said reaction vessel, a relay mechanism, means set into operation by the froth formed in said reaction vessel for actuating said relay mechanism, means in operative connection with said relay mechanism for tilting said reaction vessel to discharge its contents at the end of each estimation and means also in operative connection with said relay mechanism for tilting said measuring vessel to deliver a fresh charge of water into said reaction vessel.

16. An apparatus for controlling a chemical reaction between reacting bodies consisting in the combination with a testing apparatus comprising means for measuring a known volume of one liquid, means for adding to said known volume a second liquid, capable of reacting chemically with said first liquid to produce a physical change in the mixture at a critical stage of the reaction, a relay mechanism means controlled by said physical change for actuating said relay mechanism, of a container for said reacting bodies, adjustable feed means to said container for one of said reacting bodies and a control member for actuating said adjustable feed means operatively connected to said relay mechanism of said testing apparatus.

17. An apparatus for controlling a chemical reaction between reacting bodies consisting in the combination with a testing apparatus comprising means for measuring a known volume of one liquid, means for adding to said known volume a definite small quantity at a time of a second liquid, capable of reacting chemically with said first liquid to produce a physical change in the mixture at a critical stage of the reaction, a relay mechanism and means controlled by said physical change for actuating said relay mechanism, of a container for the reacting bodies, adjustable feed means to said container for one of said reacting bodies, a member adapted to be moved through one stage at each addition of said second liquid, a member in operative connection with said adjustable feed means and registering mechanism for bringing the two last-mentioned members into registration at the end of each analysis of said testing apparatus in operative connection with said relay mechanism of said testing apparatus.

18. An apparatus for controlling a chemical reaction between reacting bodies consisting in the combination with a testing apparatus comprising means for measuring a known volume of one liquid, means for adding to said known volume a definite small quantity at a time of a second liquid, capable of reacting chemically with said first liquid to produce a physical change in the mixture at a critical stage of the reaction, a relay mechanism and means controlled by said physical change for actuating said relay mechanism, of a container for the reacting bodies, adjustable feed means to said container for one of said reacting bodies, a rocking sector adapted to be moved through one stage at each addition of said second liquid, a second sector in operative connection with said adjustable feed means and registering mechanism for bringing the two sectors into registration at the end of each analysis of said testing apparatus in operative connection with said relay mechanism of said testing apparatus.

19. An apparatus for controlling the operation of a water-softening plant wherein a softening agent is added to the water consisting in the combination with a testing apparatus comprising in combination a reaction vessel, means for pouring a measured quantity of water into said reaction vessel, means for adding standard soap solution to the water in said reaction vessel, means for agitating the mixture in said reaction vessel, a relay mechanism and means set into operation by the froth formed in said reaction vessel for actuating said relay mechanism, of a container for the water to be softened, adjustable feed means to said container for said softening agent and a control member for actuating said adjustable feed means operatively connected to said relay mechanism of said testing apparatus.

20. An apparatus for controlling the operation of a water-softening plant wherein a softening agent is added to the water, consisting in the combination with a testing apparatus comprising in combination a reaction vessel, means for pouring a measured quantity of water into said reaction vessel, means for adding a definite small quantity at a time of standard soap solution to the water in said reaction vessel, means for agitating the mixture in said reaction vessel, a relay mechanism and means set into operation by the froth formed in said reaction vessel for actuating said relay mechanism, of a container for the water to be softened, adjustable feed means to said container for said softening agent, a member adapted to be moved through one stage at each addition of said second liquid, a member in operative connection with said adjustable feed means and registering mechanism for bringing the two last-mentioned members into registration at the end of each analysis of said testing apparatus in operative connection with said relay mechanism of said testing apparatus.

21. An apparatus for controlling the operation of a water-softening plant having a rocking shaft, measuring buckets mounted on said shaft and feed means for supplying a softening agent to the charges of water measured by said bucket, consisting in the combination with a testing apparatus comprising in combination a reaction vessel, means for pouring a measured quantity of the water into said reaction vessel, means actuated by said rocking shaft for adding in step-by-step fashion a definite small quantity at a time of standard soap solution to the water in said reaction vessel, means for agitating the mixture in said reaction vessel, a relay mechanism, and means set into operation by the froth formed in said reaction vessel for actuating said relay mechanism of means for adjusting said feed means to said container for the softening bodies and a control member for actuating said adjustable feed means operatively connected to said relay mechanism of said testing apparatus.

22. An apparatus for controlling the operation of a water-softening plant having a rocking shaft, measuring buckets mounted on said shaft and feed means for supplying a softening agent to the charges of water measured by said bucket, consisting in the combination with a testing apparatus comprising in combination a reaction vessel, means for pouring a measured quantity of the water into said reaction vessel, means actuated by said rocking shaft for adding in step-by-step fashion a definite small quantity at a time of standard soap solution to the water in said reaction vessel, means for agitating the mixture in said reaction vessel, a relay mechanism, and means set into operation by the froth formed in said reaction vessel for actuating said relay mechanism, means for adjusting said feed means to said container for the softening bodies, a member adapted to be moved through one stage at each addition of said second liquid, a member in operative connection with said adjustable feed means and registering mechanism for bringing the two last-mentioned members into registration at the end of each analysis of said testing apparatus in operative connection with said relay mechanism of said testing apparatus.

23. An apparatus for controlling the operation of a water-softening plant having a rocking shaft, measuring buckets mounted on said shaft wherein a softening agent is supplied to the charges of water measured by said bucket, consisting in the combination with a testing apparatus comprising in combination a reaction vessel, means for pouring a measured quantity of the water into said reaction vessel, means actuated by said rocking shaft for adding in step-by-step fashion a definite small quantity at a time of standard soap solution to the water in said reaction vessel, means for agitating the mixture in said reaction vessel, a relay mechanism, and means set into operation by the froth formed in said reaction vessel for actuating said relay mechanism, a reciprocating valve of variable volume to said container for said softening agent and a control member for setting the effective volume of said valve operatively connected to said relay mechanism of said testing apparatus.

In witness whereof I hereunto subscribe my name this 28th day of September, A. D. 1926.

HENRY STAFFORD HATFIELD.